(12) United States Patent
Zheng

(10) Patent No.: US 6,640,173 B1
(45) Date of Patent: Oct. 28, 2003

(54) SYSTEM AND METHOD OF CONTROLLING A VEHICLE HAVING YAW STABILITY CONTROL

(75) Inventor: Bing Zheng, Dublin, OH (US)

(73) Assignee: Visteon Global Technologiee, Inc., Dearborn, MI (US)

(*) Notice: Subject to any disclaimer, the term of this patent is extended or adjusted under 35 U.S.C. 154(b) by 0 days.

(21) Appl. No.: 10/364,618

(22) Filed: Feb. 11, 2003

(51) Int. Cl.⁷ .............................................. G06F 17/00
(52) U.S. Cl. ......................................... 701/41; 180/410
(58) Field of Search ............................. 701/41, 36, 37, 701/38, 1; 340/465; 180/410, 400–409

(56) References Cited

U.S. PATENT DOCUMENTS

| | | |
|---|---|---|
| 4,830,127 A | 5/1989 | Ito et al. |
| 5,228,757 A | 7/1993 | Ito et al. |
| 5,247,441 A | 9/1993 | Serizawa et al. |
| 5,251,135 A | 10/1993 | Serizawa et al. |
| 5,347,458 A | 9/1994 | Serizawa et al. |
| 5,925,083 A | 7/1999 | Ackermann |
| 5,941,919 A | 8/1999 | Pastor et al. |
| 6,176,341 B1 | 1/2001 | Ansari |
| 6,219,604 B1 | 4/2001 | Dilger et al. |
| 6,338,012 B2 | 1/2002 | Brown et al. |
| 6,415,212 B2 | 7/2002 | Nishizaki et al. |
| 6,449,542 B1 | 9/2002 | Bottiger et al. |
| 6,449,543 B2 | 9/2002 | Nishizaki et al. |
| 6,450,592 B1 | 9/2002 | Nishizaki et al. |

FOREIGN PATENT DOCUMENTS

| | | |
|---|---|---|
| JP | 11 29020 | 11/1999 |
| JP | 11 99921 | 11/1999 |
| JP | 11 99923 | 11/1999 |

OTHER PUBLICATIONS

US Patent Application Publication 2001/0008986, Publication Date: Jul. 19, 2001, Inventor: Brown et al., entitled: Roll Over Stability Control For An Automotive Vehicle.

US Patent Application Publication 2001/0011201, Publication Date: Aug. 2, 2001, Inventor: Nishizaki et al., entitled: Steering Device For Vehicle.

US Patent Application Publication 2001/0027893, Publication Date: Oct. 11, 2001, Inventor: Nishizaki et al., entitled: Steering Device For Vehicle.

US Patent Application Publication 2002/00136646, Publication Date: Jan. 31, 2002, Inventor: Nishizaki et al., entitled: Motor Vehicle Steering System.

US Patent Application Publication 2002/0030407, Publication Date: Mar. 14, 2002, Inventor: Nishizaki et al., entitled: Motor Vehicle Braking System.

(List continued on next page.)

*Primary Examiner*—Richard M. Camby
(74) *Attorney, Agent, or Firm*—Brinks Hofer Gilson & Lione

(57) ABSTRACT

The present invention involves a method of controlling a vehicle having a steer-by-wire system with enhanced yaw stability during a yaw motion disturbance. The method includes generating a steering angle signal of the steer-by-wire system. The steering angle signal is indicative of a steering angle. The method further includes generating an extra road wheel angle signal using a gain scheduled proportional-integral control strategy and an instant proportional-integral control strategy configured to attenuate after a predetermined time lapse from a time zero. The extra road wheel angle signal is indicative of an extra road wheel angle to compensate for the yaw motion disturbance defining the time zero. The method further includes generating a road wheel angle signal indicative of a road wheel angle and applying torque to the road wheels to move the road wheels consistent with the road wheel angle based on the road wheel angle signal.

41 Claims, 2 Drawing Sheets

OTHER PUBLICATIONS

US Patent Application Publication 2002/0056582, Publication Date: May 16, 2002, Inventor: Chubb et al., entitled: Wheel Lift Identification For An Automotive Vehicle.

US Patent Application Publication 2002/0079155, Publication Date: Jun. 27, 2002, Inventor: Andonian et al., entitled: Steer–By–Wire System With Steering Feedback.

US Patent Application Publication 2002/0082749, Publication Date: Jun. 27, 2002, Inventor: Meyers et al., entitled: Roll Over Stability Control For An Automotive Vehicle Having Rear Wheel Steering.

US Patent Application Publication 2002/0095244, Publication Date: Jul. 18, 2002, Inventor: Rhode et al., entitled: Rollover Stability Control For An Automotive Vehicle Using Front Wheel Actuators.

US Patent Application Publication 2002/0108805, Publication Date: Aug. 15, 2002, Inventor: Card, entitled: Oversteer Control For A Motor Vehicle.

US Patent Application Publication 2002/0117347, Publication Date: Aug. 29, 2002, Inventor: Nishizaki et al., entitled: Steering Device For Vehicle.

US Patent Application Publication 2002/0129988, Publication Date: Sep. 19, 2002, Inventor: Stout et al., entitled: Vehicle Steering System Control.

US Patent Application Publication 2002/0139599, Publication Date: Oct. 3, 2002, Inventor: Lu et al., entitled: Rollover Stability Control For An Automotive Vehicle Using Rear Wheel Steering And Brake Control.

SYSTEM AND METHOD OF CONTROLLING A VEHICLE HAVING YAW STABILITY CONTROL

BACKGROUND OF THE INVENTION

The present invention relates to systems and methods of controlling a vehicle having an enhanced yaw stability feature for a yaw motion disturbance of the vehicle.

Steer-by-wire systems are known in the automotive industry. Steer-by-wire systems replace mechanical linkages between a steering wheel and road wheels of a vehicle with electrical wires and electronic components. The mechanical linkages between the road wheels are eliminated and replaced by components such as road wheel actuators, road wheel position sensors, power electric drivers, and an electronic control unit.

Although many steer-by-wire systems are adequate, improvements may be made upon such systems. For instance, during normal operation, a vehicle having a steer-by-wire system may experience a yaw motion disturbance caused by loss of tire air pressure, braking on icy roads, or side wind. The yaw motion disturbance may cause unexpected driving conditions of the vehicle requiring the driver to undesirably take actions in maneuvering the vehicle back to a normal driving condition. This is undesirable.

BRIEF SUMMARY OF THE INVENTION

Thus, it is an aspect of the present invention to provide a method of controlling a vehicle having a steer-by-wire system with enhanced yaw stability during a yaw motion disturbance, wherein the method includes a yaw stability control strategy to assist a driver of the vehicle to compensate for the yaw motion disturbance.

It is another aspect of the present invention to provide a method of controlling a vehicle having a steer-by-wire system with enhanced yaw stability during a yaw motion disturbance, wherein the steer-by-wire system controls steering prior to a driver's reaction time while allowing the driver overall authority of steering control during the reaction time.

In one embodiment, the method includes sensing a steering wheel angle, speed, a yaw rate of the vehicle and generating a steering angle signal of the steer-by-wire system. The steering angle signal is indicative of a steering angle which is based on the steering ratio of the vehicle, the steering wheel angle, and speed of the vehicle. The method further includes generating an extra road wheel angle signal indicative of an extra road wheel angle to compensate for the yaw motion disturbance using a gain scheduled proportional-integral control strategy and an instant proportional-integral control strategy. Before a predetermined time lapse, a road wheel angle of the vehicle is determined and is based on the extra road wheel angle signal and a steering wheel angle signal. After the predetermined time lapse, the road wheel angle is based on the steering wheel angle signal alone. The method further includes applying torque to the road wheels to move the road wheels consistent with the road wheel angle signal.

Further aspects, features and advantages of the invention will become apparent from consideration of the following description and the appended claims when taken in connection with the accompanying drawings.

DETAILED DESCRIPTION OF THE INVENTION

The present invention generally provides a system and method of controlling a vehicle during a yaw motion disturbance while allowing a driver of the vehicle overall authority of steering control activities. This is accomplished by activating an enhanced yaw compensation system stability feature of the steer-by-wire system prior to a human reaction time of a yaw motion disturbance of the vehicle. This feature allows the system to compensate for the yaw motion disturbance typically caused by loss of tire air pressure, braking on icy roads, or side wind which would otherwise leave the driver in an undesirable condition to maneuver the vehicle back to a typical driving condition. The control effects are diminished or attenuated after a predetermined time lapse before the human reaction time allowing the driver to maintain overall authority of the steering control activities during the human reaction time.

Figure 1:
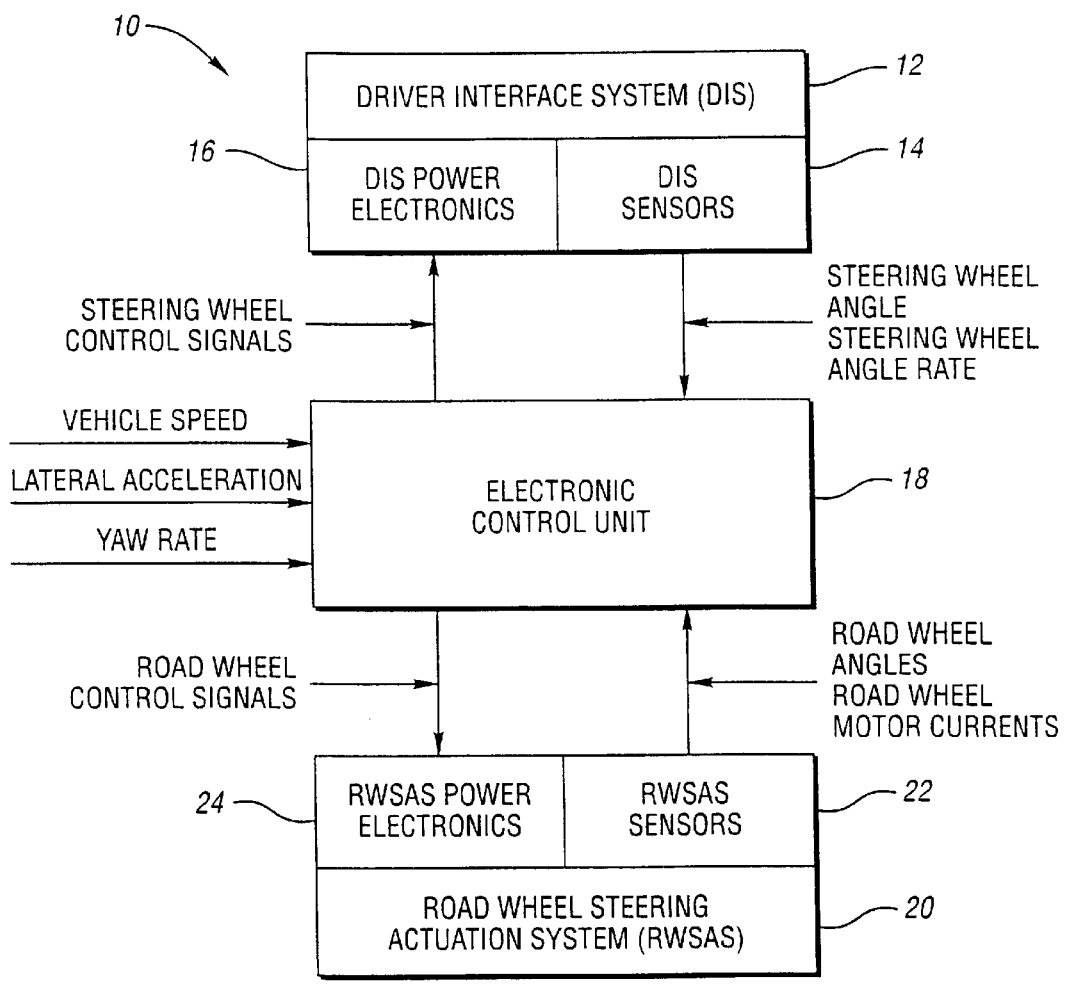
FIG. 1 is a schematic diagram of an assembly for a vehicle steer-by-wire system assembly in accordance with one embodiment of the present invention.

FIG. 1 illustrates a schematic diagram of a steer-by-wire system with an enhanced yaw compensation system stability feature for a yaw motion disturbance of a vehicle in accordance with one embodiment of the present invention. As shown, steer-by-wire system 10 includes a driver interface system 12 including a steering wheel, driver interface sensors 14 and driver interface power electronics 16. In this embodiment, the driver interface sensors 14 are disposed in communication with the steering wheel, or a joy stick, or any other suitable means for a driver to control or maneuver a vehicle, and are capable of sensing the angular position of the steering wheel. The driver interface electronics 16 include electronic components capable of receiving data to provide steering feel to a driver of the vehicle, e.g., receivers, transmitters, actuators, and other suitable components. In this embodiment, the driver interface system 12 senses a steering wheel angle of the vehicle and generates a steering wheel angle signal indicative of the steering wheel angle.

As shown in FIG. 1, the steer-by-wire system 10 with an enhanced yaw compenation system feature further includes an electronic control unit 18 configured to generate a road wheel angle signal to compensate for the yaw motion disturbance. The electronic control unit includes a microprocessor which incorporates the enhanced yaw compensation system stability strategy of the present invention. In this embodiment, the road wheel angle signal is based on an extra road wheel angle signal and a steering wheel angle signal before a predetermined time lapse relative to the time zero. After the predetermined time lapse, the road wheel angle is based on the steering wheel angle signal alone. The electronic control unit (ECU) is configured to receive signals indicative of vehicle variables including vehicle speed, lateral acceleration, and yaw rate. This may be accomplished by implementation of sensors or any other suitable means known in the art. As shown, the ECU 18 is in electrical communication with the driver interface system 12 wherein the driver interface sensors 14 generate steering wheel angle signals to the ECU 18 and the ECU 18 generates steering wheel control signals to the driver interface power electronics 16 for steering feel.

System 10 further includes a road wheel actuating system 20 including road wheel actuating system sensors 22 and road wheel power electronics 24 in electrical communication with ECU 18. The sensor 22 may be disposed adjacent to and associated with road wheels of the vehicle to measure road wheel angle. Power electronics 24 include electronic components capable of receiving data from ECU 18 to provide rotation or movement of the road wheels, e.g., motors, actuators. As shown, road wheel actuating system 20 is in electrical communication-with ECU 18 wherein sensors 22 generate and transmit road wheel angle signals to ECU 18 and ECU 18 generates and transmits road wheel control signals to road wheel power electronics 24.

Figure 2:
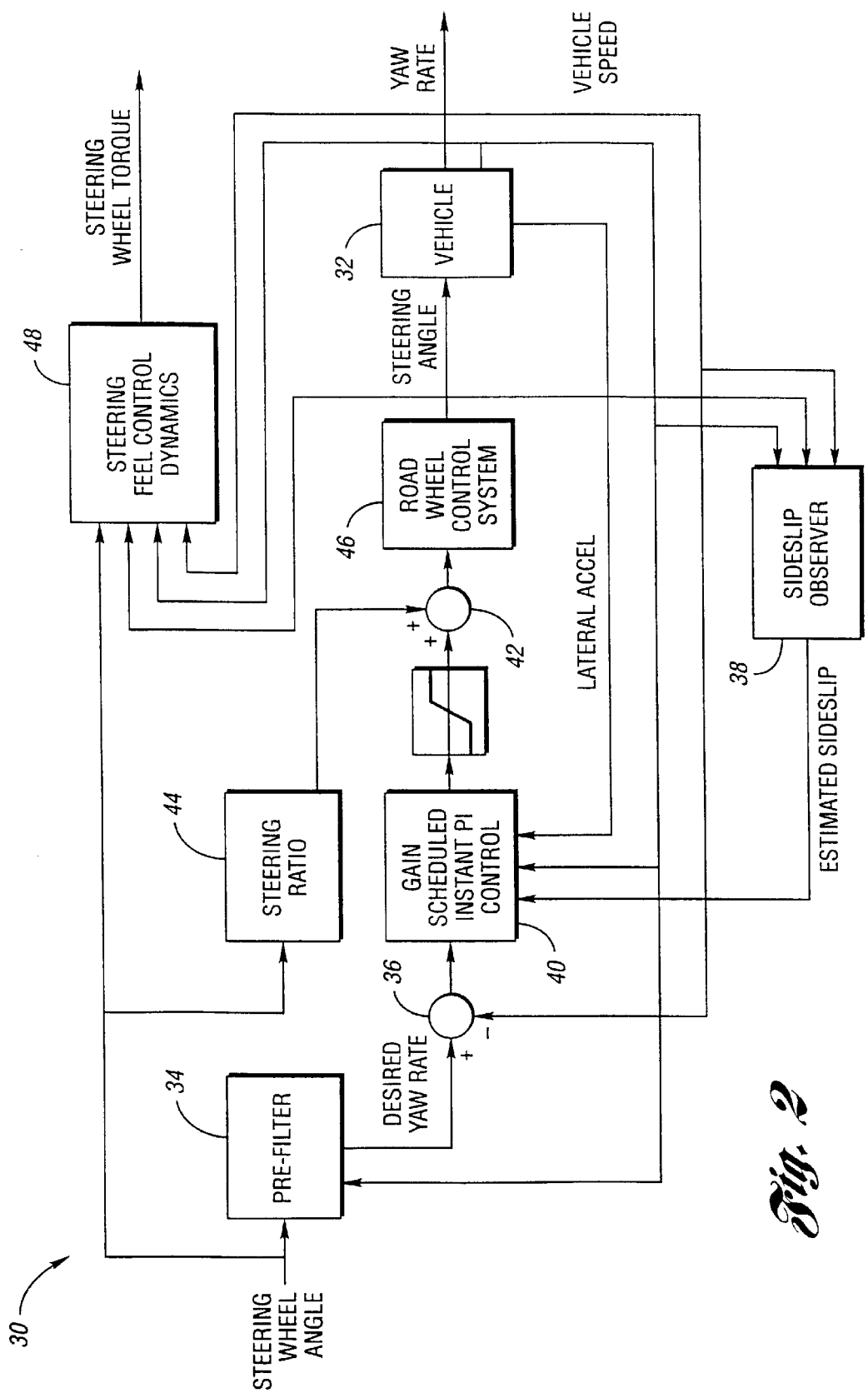
FIG. 2 is a block diagram of the steer-by-wire control system having a gain scheduled proportional-integral control strategy and an instant proportional-integral control strategy in accordance with one embodiment of the present invention.

FIG. 2 depicts an example of a block diagram showing an enhanced yaw stability control strategy 30 implemented by the steer-by-wire system 10 in FIG. 1. As shown, a vehicle having the steer-by-wire system is depicted in block 32. During operation of the vehicle, steering wheel angle and road wheel angle are sensed by the sensors 14 and 22 discussed in FIG. 1. Additional vehicle variables are sensed and may include, lateral acceleration, speed, and a measured yaw rate of the vehicle.

A pre-filter is depicted in block 34 configured to receive steering wheel angle and vehicle speed. The steering wheel angle and vehicle speed are applied to a pre-filter function which calculates a desired yaw rate for yaw control. The desired yaw rate is calculated such that steering wheel angle, vehicle speed, and other vehicle parameters are incorporated therein. In this embodiment, a mathematical representation of the pre-filter function is as follows:

$$r_{des} = \frac{VhSpd * Steeringratio * SWA}{L + K * VhSpd^2},$$

where $r_{des}$ is indicative of desired yaw rate; L is indicative of wheelbase of the vehicle; K is indicative of understeer coefficient; VhSpd is indicative of vehicle speed; and SWA is indicative of steering wheel angle. The pre-filter function generates a desired yaw rate signal indicative of the desired yaw rate. Yaw rate summer 36 receives the desired yaw rate signal and the measured yaw rate signal, and compares the desired yaw rate with the measured yaw rate. The summer 36 determines a yaw error which is the difference between the desired yaw rate and the measured yaw rate, and generates a yaw error signal indicative of the yaw error.

In this embodiment, a sideslip observer function 38 is implemented which calculates an estimated sideslip of the vehicle. In this embodiment, the sideslip observer function incorporates vehicle variables including lateral acceleration, vehicle speed, and measured yaw rate. The estimated sideslip feature includes a saturator for control output including:

$$control = \begin{cases} (K_{ip}(z)K_p + K_{ii}(z)K_i) * Yaw_{error} & \text{if } abs(contol) < control_{thd} \\ control_{thd} & \text{if } control >= control_{thd} \\ -control_{thd} & \text{if } control <= -control_{thd} \end{cases}$$

where $Yaw_{error}$ is indicative of a difference between the measured yaw rate and the desired yaw rate; and $Control_{thd}$ is indicative of a control threshold. The control threshold is determined by:

$$control_{thd} = control_{max} * \min\left\{\frac{1}{control_{Vpd} + k_{vpd}V_{spd}}, \frac{1}{control_{lat} + k_{lat}Lat}, \frac{1}{control_{ss} + k_{ss}sideslip}\right\}$$

where $Control_{max}$ is indicative of maximal control output; Lat is indicative of lateral acceleration; Sideslip is indicative of sideslip angle; $Control_{vpd}$, $k_{vpd}$ is indicative of constants of saturator with respect to vehicle speed; $Control_{lat}$, $k_{lat}$ is indicative of constants of saturator with respect to vehicle's lateral acceleration; and $Control_{ss}$, $k_{ss}$, is indicative of constants of saturator with respect to vehicle's side slip angle.

As shown, the enhanced yaw stability control strategy 30 further includes a gain scheduled proportional-integral control and an instant proportional-integral control depicted in block 40 to generate a compensating steering angle of the vehicle as discussed in greater detail below. In block 40 the yaw error is compared with an error threshold. Strategy 30 is restarted, if the yaw error is greater than the error threshold. In this embodiment, the error threshold is preferably between about 0.1 to 2.0 degrees per second and more preferably about 1 degree per second. In block 40 the gain scheduled proportional-integral control includes:

$$K_p = \frac{P_1}{P_2 + k_p V_{spd}}, \quad \text{and} \quad K_i = \frac{I_1}{I_2 + k_i V_{spd}},$$

where $K_p$ is indicative of proprtional gain; $K_i$ is indicative of integral gain; $V_{spd}$ is indicative of Vehicle speed; $P_1$, $P_2$, $k_p$ are constants for gain-scheduled proportional control; and $I_1$, $I_2$, $k_i$ are constants for gain-scheduled integral control.

Moreover, the instant proportional-integral control includes:

$$K_{ip}(z) = k_{ip}\frac{a_{p0}z^2 + a_{p1}z^1 + a_{p2}}{z^2 + b_{p1}z^1 + b_{p0}}, \quad \text{and}$$

$$K_{ii}(z) = k_{ii}\frac{a_{i0}z^2 + a_{i1}z^1 + a_{i2}}{z^2 + b_{i1}z^1 + b_{i0}},$$

where $z^k$ is indicative of time shift operator which shifts the time by k units; $k_{ip}$ is indicative of gain for P attenuator; $k_{ii}$ is indicative of gain for I attenuator; $a_{pk}$, $b_{pk}$ are indicative of constants for P attenuator; and $a_{ik}$, $b_{ik}$ are indicative of constants for I attenuator.

With the equations provided above, control strategy 30 calculates a compensating steer angle and generates a compensating steer angle control signal indicative thereof in block 40 if the yaw error is determined to be greater than an error threshold.

In this embodiment, a limiter is incorporated therein which sets a maximal compensating steering angle based on vehicle speed. If the vehicle speed is below 20 miles per hour, then the maximal compensating steer angle is limited to about +/−3°. If the vehicle speed is above 60 miles per hour, then the maximal compensating steering angle is limited to about +/−1°. Of course, other limitations may be implemented without falling beyond the scope or spirit of the present invention.

The control strategy determines the extra road wheel angle, if the yaw error is determined to be greater than an error threshold. After the limiter, an extra road wheel angle signal is generated indicative of an extra road wheel angle to compensate for the yaw motion disturbance defining a time zero, if the yaw error is determined to be greater than an error threshold. Road wheel angle summer 42 generates a road wheel angle signal indicative of a road wheel angle of a vehicle. As shown, summer 42 receives road wheel control system command reference signal from steering ratio function 44 which calculates a road wheel control system command reference based on the steering wheel angle and a predetermined steering ratio of the vehicle.

Depending on a predetermined time lapse relative to the time zero, summer 42 may also incorporate the extra road wheel angle signal to generate the road wheel angle signal. Before the predetermined time lapse, the road wheel angle signal is based on the road wheel angle signal and the steering wheel angle signal. After the predetermined time lapse, the road wheel angle is based on the steering wheel angle alone. As a result, this allows the driver of the vehicle overall authority of steering control activities of the vehicle. The strategy is only activated during the predetermined time lapse which has been determined to be configured at a time before a human reaction time, a time at which a human is naturally capable of responding to a driving condition change. In this embodiment, the predetermined time lapse is less than about 0.5 second. This accomplishes an attenuation of the control effect of the strategy thereby allowing the driver to maintain overall steering control of the vehicle during the human reaction time.

FIG. 2 further depicts road wheel control system 46 configured to receive the road wheel angle signal and apply a proportional amount of torque to the road wheels of the vehicle to move the road wheels consistent with the road wheel angle.

The steering ratio function 44 generates the road wheel command reference signal indicative of a road wheel command reference. The road wheel command reference is based on a predetermined steering ratio of the vehicle and the steering wheel angle. The predetermined steering ratio may vary based on the type of vehicle or mode of the steer-by-wire system used.

Figure 3:
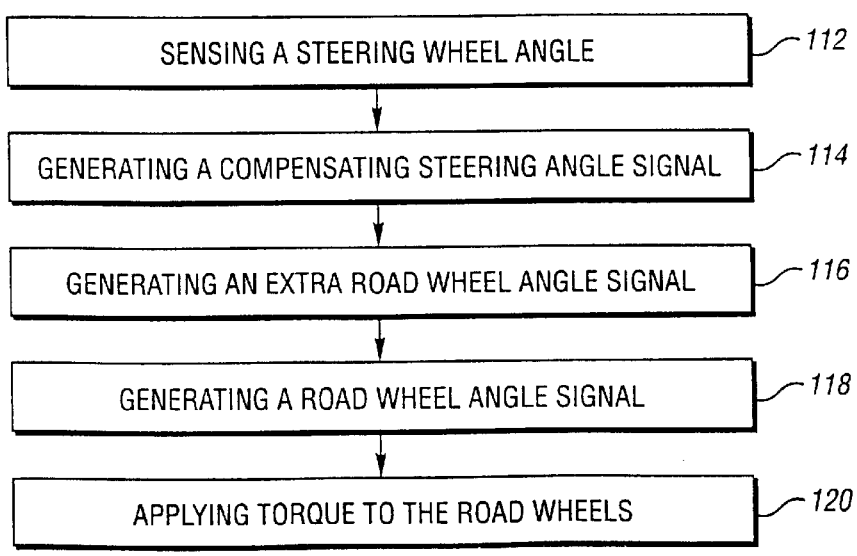
FIG. 3 is a flow chart depicting one method of controlling a vehicle having the steer-by-wire system of FIG. 1 and implementing the control strategy in FIG. 2 with an enhanced yaw stability feature during a yaw motion disturbance of the vehicle.

It is to be understood that the present invention provides a system and method of controlling a vehicle during a yaw motion disturbance while allowing the driver of the vehicle overall authority of steering control activities thereof. FIG. 3 illustrates a flow chart of one method 110 of controlling a vehicle having a steer-by-wire system in FIG. 1 with an enhanced yaw stability control strategy in FIG. 2 during a yaw motion disturbance in accordance with one embodiment of the present invention. As shown, method 110 includes sensing vehicle variables in box 112 and generating a compensating steering angle signal of the steer-by-wire system in box 114. In this embodiment, the steer-by-wire system implements a gain scheduled proportional-integral control strategy and an instant proportional-integral control strategy as mentioned above. The compensating steering angle signal is indicative of a compensating steering angle based on lateral acceleration and speed of the vehicle.

As mentioned above, the steer-by-wire system of the present invention implements a gain scheduled proportional-integral control strategy including:

$$K_p = \frac{P_1}{P_2 + k_p V_{spd}}, \quad \text{and} \quad K_i = \frac{I_1}{I_2 + k_i V_{spd}},$$

where $K_p$ is indicative of Prepositional gain; $K_i$ is indicative of integral gain; $V_{spd}$ is indicative of Vehicle speed; $P_1$, $P_2$, $k_p$ are constants for gain-scheduled proportional control; and $I_1$, $I_2$, $k_i$ are constants for gain-scheduled integral control. Moreover, the instant proportional-integral control strategy includes:

$$K_{ip}(z) = k_{ip} \frac{a_{p0} z^2 + a_{p1} z^1 + a_{p2}}{z^2 + b_{p1} z^1 + b_{p0}}, \quad \text{and}$$

$$K_{ii}(z) = k_{ii} \frac{a_{i0} z^2 + a_{i1} z^1 + a_{i2}}{z^2 + b_{i1} z^1 + b_{i0}},$$

where $z^k$ is indicative of time shift operator which shifts the time by k units; $k_{ip}$ is indicative of gain for P attenuator; $k_{ii}$ is indicative of gain for I attenuator; $a_{pk}$, $b_{pk}$ are indicative of constants for P attenuator; and $a_{ik}$, $b_{ik}$ are indicative of constants for I attenuator.

Method 110 further includes generating an extra road wheel angle signal indicative of an extra road wheel angle in box 116 to compensate for the yaw motion disturbance defining a times zero, if the yaw error is determined to be greater than an error threshold. In box 118 the method includes generating a road wheel angle signal indicative of a road wheel angle. In this embodiment, the road wheel angle is based on the extra road wheel angle and the steering wheel angle, before a predetermined time lapse relative to the times zero. However, the road wheel angle is based on the steering wheel angle alone, after the predetermined time lapse relative to the times zero. Method 110 further includes applying torque to the road wheels to move the road wheels based on the road wheel angle in box 120.

As a result, the control effect diminishes or attenuates after a predetermined time lapse. As mentioned above, it has been determined that only after the predetermined time lapse is a typical driver capable of reacting to a yaw motion disturbance of the vehicle. Thus, the enhanced yaw compensation system is activated to control the vehicle only prior to the predetermined time lapse so that the driver may obtain overall authority of control maneuvers of the vehicle thereafter avoiding simultaneous steering inputs from the driver and the system. Thus, the vehicle may be controlled by the steer-by-wire system without influencing or interfering with the driver's control maneuvers after the predetermined time lapse.

While the present invention has been described in terms of preferred embodiments, it will be understood, of course, that the invention is not limited thereto since modifications may be made to those skilled in the art, particularly in light of the foregoing teachings.

What is claimed is:

1. A method of controlling a vehicle having a steer-by-wire system with enhanced yaw stability during a yaw motion disturbance, the method comprising:

sensing a steering wheel angle, speed, and yaw rate of the vehicle;

generating a steering angle signal of the steer-by-wire system, the steering angle signal being indicative of a steering angle based on steering wheel angle and steering ratio;

generating an extra road wheel angle signal implementing a gain schedule proportional-integral control strategy and an instant proportional-integral control strategy, the extral road wheel angle signal being indicative of an extra road wheel angle to compensate for the yaw motion disturbance defining a time zero;

generating a road wheel angle signal indicative of a road wheel angle, the road wheel angle being based on the extra road wheel angle and the steering wheel angle before a predetermined time lapse, the road wheel angle being based on the steering wheel angle after the predetermined time lapse relative to a time zero; and applying torque to the road wheels to move the road wheels based on the road wheel angle.

2. The method of claim 1 wherein the Gain scheduled proportional-integrated control strategy includes:

$$K_p = \frac{P_1}{P_2 + k_p V_{spd}}, \quad \text{and} \quad K_i = \frac{I_1}{I_2 + k_i V_{spd}},$$

where $K_p$ is indicative of proportional gain; $K_i$ is indicative of integral gain; $V_{spd}$ is indicative of Vehicle speed; $P_1$, $P_2$, $k_p$ are constants for gain-scheduled proportional control; and $I_1$, $I_2$, $k_i$ are constants for gain-scheduled integral control.

3. The method of claim 2 wherein the instant Proportional and Integral control strategy includes:

$$K_{ip}(z) = k_{ip} \frac{a_{p0}z^2 + a_{p1}z^1 + a_{p2}}{z^2 + b_{p1}z^1 + b_{p0}}, \quad \text{and}$$

$$K_{ii}(z) = k_{ii} \frac{a_{i0}z^2 + a_{i1}z^1 + a_{i2}}{z^2 + b_{i1}z^1 + b_{i0}},$$

where $z^k$ is indicative of time shift operator which shifts the time by k units; $k_{ip}$ is indicative of gain for P attenuator; $k_{ii}$ is indicative of gain for I attenuator; $a_{pk}$, $b_{pk}$ are indicative of constants for P attenuator; and $a_{ik}$, $b_{ik}$ are indicative of constants for I attenuator.

4. The method of claim 1 wherein the estimated side slip includes a saturator for control output including:

$$control = \begin{cases} (K_{ip}(z)K_p + K_{ii}(z)K_i) * Yaw_{error} & \text{if } abs(contol) < control_{thd} \\ control_{thd} & \text{if } control >= control_{thd} \\ -control_{thd} & \text{if } control <= -control_{thd} \end{cases}$$

where $Yaw_{error}$ is indicative of a difference between the measured yaw rate and the desired yaw rate; and $Control_{thd}$ is indicative of a control threshold, the control threshold being determined by:

$$control_{thd} = control_{max} * \min\left\{\frac{1}{control_{vpd} + k_{vpd}V_{spd}}, \frac{1}{control_{lat} + k_{lat}Lat}, \frac{1}{control_{ss} + k_{ss}sideslip}\right\}$$

where $Control_{max}$ is indicative of maximal control output; Lat is indicative of lateral acceleration; Sideslip is indicative of sideslip angle; $Control_{vpd}$, $k_{vpd}$ is indicative of constants of saturator with respect to vehicle speed; $Control_{lat}$, $k_{lat}$ is indicative of constants of saturator with respect to vehicle's lateral acceleration; and $Control_{ss}$, $k_{ss}$ is indicative of constants of saturator with respect to vehicle's sideslip angle.

5. The method of claim 1 further comprising comparing the yaw error with the error thresholds.

6. The method of claim 1 wherein the steer-by-wire system includes a sampling period of about 1 microsecond.

7. The method of claim 1 wherein the predetermined time lapse is about 0.5 second.

8. The method of claim 1 further comprising generating the road wheel command reference signal indicative of a road wheel command reference, the road wheel command reference being based on a predetermined steering ratio and the steering wheel angle.

9. The method of claim 1 further comprising:
calculating the extra road wheel angle, if the yaw error is determined to be greater than an error threshold; and
calculating a road wheel angle based on the extra road wheel angle.

10. The method of claim 4 further comprising:
calculating the estimated side slip angle based on the road wheel angle, speed and the yaw rate of the vehicle.

11. The method of claim 1 further comprising:
sensing lateral acceleration of the vehicle;
generating a desired yaw rate signal indicative of a desired yaw rate, the desired yaw rate being based on the steering wheel angle and the vehicle speed;
generating a yaw error signal indicative of a yaw error, the yaw error being based on the desired yaw rate and the measured yaw rate;
determining the desired yaw rate based on the steering wheel angle and the vehicle speed; and
determining the yaw error based on the desired yaw rate and the measured yaw rate.

12. The method of claim 11 further comprising determining whether an estimated side slip is greater than a side slip threshold.

13. The method of claim 12 further comprising:
generating an estimated side slip signal indicative of the estimated side slip of the vehicle based on the road wheel angle, speed, and the yaw rate of the vehicle; and
generating a steering wheel angle signal indicative of the steering wheel angle, a lateral acceleration signal indicative of lateral acceleration, a vehicle speed signal indicative of vehicle speed, a yaw rate signal indicative of yaw rate, and an estimated side slip signal indicative of the estimated side slip.

14. The method of claim 1 wherein the compensating steering angle has a maximum angle based on the speed of the vehicle.

15. The method of claim 14 wherein the maximum steering angle is about +/−3° if the vehicle speed is determined to be less than 20 miles per hour and the maximum steering angle is about +/−1°, if the vehicle speed is determined to be greater than 60 miles per hour.

16. The method of claim 1 wherein generating the desired yaw rate signal includes:
receiving the steering wheel angle and the vehicle speed; and
prefiltering the steering wheel angle and vehicle speed.

17. The method of claim 16 wherein the step of filtering includes:

$$r_{des} = \frac{VhSpd * Steeringratio * SWA}{L + K * VhSpd^2}$$

$r_{des}$ is indicative of desired yaw rate; L is indicative of wheelbase of the vehicle; K is indicative of understeer coefficient; Vh Spd is indicative of vehicle speed; and SWA is indicative of steering wheel angle.

18. The method of claim 1 wherein generating the compensating steering angle signal and generating the extra road wheel angle signal are performed, if a yaw error is determined to be greater than an error threshold.

19. The method of claim 18 wherein the error threshold is 1 degree per second.

20. The method of claim 1 wherein the error threshold is about 0.1 to 2.0 degrees per second.

21. A method of controlling a vehicle having a steer-by-wire system with enhanced yaw stability during a yaw motion disturbance, the method comprising:
sensing a steering wheel angle, lateral acceleration, speed, and a yaw rate of the vehicle;

generating a desired yaw rate signal indicative of a desired yaw rate, the desired yaw rate being based on the steering wheel angle and the vehicle speed;

generating a yaw error signal indicative of a yaw error, the yaw error being based on the desired yaw rate and the measured yaw rate;

generating a compensating, steering angle signal of the steer-by-wire system implementing a gain scheduled proportional-integral control strategy and an instant proportional-integral control strategy the compensating steering angle signal being indicative of a compensating steering angle, if the yaw error is determined to be greater than an error threshold;

generating an extra road wheel angle signal indicative of an extra road wheel angle to compensate for the yaw motion disturbance defining a time zero, if the yaw error is determined to be greater than an error threshold;

generating a road wheel angle signal indicative of a road wheel angle, the road wheel angle being based on the extra road wheel angle and a steering wheel angle before a predetermined time lapse, the road wheel angle being based on the steering wheel angle after the predetermined time lapse relative to the time zero; and applying torque to the road wheels to move the road wheels consistent with the road wheel angle.

22. The method of claim 21 wherein the Gain scheduled proportional-integrated control strategy includes:

$$K_p = \frac{P_1}{P_2 + k_p V_{spd}}, \text{ and}$$

$$K_i = \frac{I_1}{I_2 + k_i V_{spd}},$$

where $K_p$ is indicative of proportional gain; $K_i$ is indicative of integral gain; $V_{spd}$ is indicative of Vehicle speed; $P_1$, $P_2$, $k_p$ are constants for gain-scheduled proportional control; and $I_1$, $I_2$, $k_i$ are constants for gain-scheduled integral control.

23. The method of claim 22 wherein the instant Proportional-integral control strategy includes:

$$K_{ip}(z) = k_{ip} \frac{a_{p0}z^2 + a_{p1}z^1 + a_{p2}}{z^2 + b_{p1}z^1 + b_{p0}}, \text{ and}$$

$$K_{ii}(z) = k_{ii} \frac{a_{i0}z^2 + a_{i1}z^1 + a_{i2}}{z^2 + b_{i1}z^1 b_{i0}},$$

where $z^k$ is indicative of time shift operator which shifts the time by k units; $k_{ip}$ is indicative of gain for P attenuator; $k_{ii}$ is indicative of gain for I attenuator; $a_{pk}$, $b_{pk}$ are indicative of constants for P attenuator; and $a_{ik}$, $b_{ik}$ are indicative of constants for I attenuator.

24. The method of claim 23 wherein the estimated side slip includes a saturator for control output including:

$$control = \begin{cases} (K_{ip}(z)K_p + K_{ii}(z)K_i) * Yaw_{Error} & \text{if } abs(control) < control_{thd} \\ control_{thd} & \text{if } control >= control_{thd} \\ -control_{thd} & \text{if } control <= -control_{thd} \end{cases}$$

where $Yaw_{error}$ is indicative of a difference between the measured yaw rate and the desired yaw rate; and $Control_{thd}$ is indicative of a control threshold, the control threshold being determined by:

$$control_{thd} = control_{max} * \min\left\{\frac{1}{control_{Vpd} + k_{vpd}V_{spd}}, \frac{1}{control_{lat} + k_{lat}Lat}, \frac{1}{control_{ss} + k_{ss}sideslip}\right\}$$

where $Control_{max}$ is indicative of maximal control output; Lat is indicative of lateral acceleration; Sideslip is indicative of sideslip angle; $Control_{vpd}$, $k_{vpd}$ is indicative of constants of saturator with respect to vehicle speed; $Control_{lat}$, $k_{lat}$ is indicative of constants of saturator with respect to vehicle's lateral acceleration; and $Control_{ss}$, $k_{ss}$ is indicative of constants of saturator with respect to vehicle's sideslip angle.

25. The method of claim 1 further comprising comparing the yaw error with the error thresholds.

26. The method of claim 1 wherein the error threshold is 1 degree per second.

27. The method of claim 1 wherein the predetermined time lapse is about 0.5 second.

28. The method of claim 1 further comprising generating the road wheel command reference signal indicative of a road wheel command reference, the road wheel command reference being based on a predetermined steering ratio and the steering wheel angle.

29. The method of claim 1 further comprising:
calculating the extra road wheel angle, if the yaw error is determined to be greater than an error threshold; and
calculating a road wheel angle based on the extra road wheel angle.

30. The method of claim 4 further comprising:
calculating the estimated side slip angle based on the road wheel angle speed and the yaw rate of the vehicle.

31. The method of claim 21 further comprising:
determining the desired yaw rate based on the steering wheel angle and the vehicle speed; and
determining the yaw error based on the desired yaw rate and the measured yaw rate.

32. The method of claim 31 further comprising determining whether an estimated side slip is greater than a side slip threshold.

33. The method of claim 32 further comprising:
generating an estimated side slip signal indicative of the estimated side slip of the vehicle based on the road wheel angle, speed, and the yaw rate of the vehicle; and
generating a steering wheel angle signal indicative of the steering wheel angle, a lateral acceleration signal indicative of lateral acceleration, a vehicle speed signal indicative of vehicle speed, a yaw rate signal indicative of yaw rate, and an estimated side slip signal indicative of the estimated side slip.

34. The method of claim 1 wherein the compensating steering angle has a maximum angle based on the speed of the vehicle.

35. The method of claim 14 wherein the maximum compensating steering angle is about +/−3° if the vehicle speed is determined to be less than 20 miles per hour and the maximum compensating steering angle is about +/−1° if the vehicle speed is determined to be greater than 60 miles per hour.

36. The method of claim 1 wherein generating the desired yaw rate signal includes:
receiving the steering wheel angle and the vehicle speed; and
prefiltering the steering wheel angle and vehicle speed.

37. The method of claim 16 wherein the step of filtering includes:

$$r_{des} = \frac{VhSpd * Steeringratio * SWA}{L + K * VhSpd^2}$$

$r_{des}$ is indicative of desired yaw rate; L is indicative of wheelbase of the vehicle; K is indicative of understeer coefficient; VhSpd is indicative of vehicle speed; and SWA is indicative of steering wheel angle.

38. A system for controlling a vehicle having a steer-by-wire system with enhanced yaw stability during a yaw motion disturbance, the system comprising:

a driver interface system for sensing a steering wheel angle of the vehicle;

an electronic control unit configured to generate a road wheel angle signal to compensate for the yaw motion disturbance, the road wheel angle being based on an extra road wheel angle and a steering wheel angle before a predetermined time lapse, the road wheel angle being based on the steering wheel angle after the predetermined time lapse relative to the time zero; and a road wheel actuating system for sensing lateral acceleration, speed, and measured yaw rate of the vehicle and for applying torque to the road wheels to move the road wheels consistent with the road wheel angle based on the road wheel angle signal and the predetermined steering ratio.

39. The system of claim 38 wherein the electronic control unit is configured to generate a desired yaw rate signal based on the steering wheel angle and the vehicle speed and generate a yaw error signal based on the desired yaw rate and the measured yaw rate.

40. The system of claim 39 wherein the electronic control unit is configured to generate a compensating steering angle signal of the system implementing a gain scheduled proportional-integral control strategy and an instant proportional-integral control strategy.

41. The system of claim 40 wherein the electronic control unit is configured to generate the compensating steering angle signal, if the yaw error is determined to be greater than an error threshold.

\* \* \* \* \*

UNITED STATES PATENT AND TRADEMARK OFFICE
CERTIFICATE OF CORRECTION

PATENT NO. : 6,640,173 B1  
DATED : October 28, 2003  
INVENTOR(S) : Bing Zheng

It is certified that error appears in the above-identified patent and that said Letters Patent is hereby corrected as shown below:

<u>Column 9,</u>
Line 12, immediately after "compensating" delete "," (comma).

Signed and Sealed this

Twenty-fourth Day of February, 2004

JON W. DUDAS
*Acting Director of the United States Patent and Trademark Office*